(12) United States Patent
Smith et al.

(10) Patent No.: US 7,781,057 B2
(45) Date of Patent: Aug. 24, 2010

(54) SEEDING RESINS FOR ENHANCING THE CRYSTALLINITY OF POLYMERIC SUBSTRUCTURES

(75) Inventors: James D. B. Smith, Monroeville, PA (US); Gary Stevens, Surrey (GB); John W. Wood, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 42 days.

(21) Appl. No.: 11/396,988

(22) Filed: Apr. 3, 2006

(65) Prior Publication Data

US 2006/0281380 A1 Dec. 14, 2006

Related U.S. Application Data

(63) Continuation-in-part of application No. 11/152,984, filed on Jun. 14, 2005.

(51) Int. Cl.
*B32B 7/12* (2006.01)
*H01L 23/34* (2006.01)

(52) U.S. Cl. ........................ 428/343; 257/720
(58) Field of Classification Search ................. 428/343; 257/720

See application file for complete search history.

(56) References Cited

U.S. PATENT DOCUMENTS

| | | | |
|---|---|---|---|
| 3,246,271 A | 4/1966 | Ford | |
| 3,866,316 A | 2/1975 | Takechi et al. | |
| 3,974,302 A | 8/1976 | Croop et al. | |
| 4,001,616 A | 1/1977 | Lonseth et al. | |
| 4,160,926 A | 7/1979 | Cope et al. | |
| 4,335,367 A | 6/1982 | Mitsui et al. | |
| 4,361,661 A | 11/1982 | Jackson | |
| 4,400,226 A | 8/1983 | Horrigan | |
| 4,427,740 A | 1/1984 | Stackhouse et al. | |
| 4,634,911 A | 1/1987 | Studniarz et al. | |
| 4,694,064 A | 9/1987 | Tomalia et al. | |
| 4,704,322 A | 11/1987 | Roberts | |
| 4,760,296 A | 7/1988 | Johnston et al. | |
| 4,806,806 A | 2/1989 | Hjortsberg et al. | |
| 5,011,872 A | 4/1991 | Latham et al. | |
| 5,037,876 A | 8/1991 | Birkle et al. | |
| 5,126,192 A | 6/1992 | Chellis et al. | |

(Continued)

FOREIGN PATENT DOCUMENTS

EP 0 157 936 A1 10/1985

(Continued)

OTHER PUBLICATIONS

POSS Thermosets Brochure, Hybrid Products.*

(Continued)

*Primary Examiner*—Victor S Chang

(57) ABSTRACT

The present invention provides for a resin mixture that comprises a highly structured resin 40 and a less structured resin 50. The highly structured resin 40 and the less structured resin 50 are mixed to a ratio of between 1:9 and 4:1 by volume, with a more particular ratio of 1:5 to 3:1. The highly structured resin forms ordered micro regions and the ordered micro regions impose order on surrounding less structured resin molecules. The micro regions are essentially groups of the HS resin that will naturally form order structures.

7 Claims, 5 Drawing Sheets

U.S. PATENT DOCUMENTS

| | | |
|---|---|---|
| 5,281,388 A | 1/1994 | Palmer et al. |
| 5,466,431 A | 11/1995 | Dorfman et al. |
| 5,510,174 A | 4/1996 | Litman |
| 5,540,969 A | 7/1996 | Schuler |
| 5,578,901 A | 11/1996 | Blanchet-Fincher et al. |
| 5,723,920 A | 3/1998 | Markovitz et al. |
| 5,780,119 A | 7/1998 | Dearnaley et al. |
| 5,801,334 A | 9/1998 | Theodorides |
| 5,878,620 A | 3/1999 | Gilbert et al. |
| 5,904,984 A | 5/1999 | Smith et al. |
| 5,938,934 A | 8/1999 | Balogh et al. |
| 5,982,056 A | 11/1999 | Koyama et al. |
| 6,015,597 A | 1/2000 | David |
| 6,048,919 A | 4/2000 | McCullough |
| 6,103,382 A | 8/2000 | Smith et al. |
| 6,130,495 A | 10/2000 | Schulten et al. |
| 6,130,496 A | 10/2000 | Takigawa et al. |
| 6,140,590 A | 10/2000 | Baumann et al. |
| 6,160,042 A | 12/2000 | Ishida |
| 6,190,775 B1 | 2/2001 | Smith et al. |
| 6,238,790 B1 | 5/2001 | Smith et al. |
| 6,255,738 B1 | 7/2001 | Distefano et al. |
| 6,261,424 B1 | 7/2001 | Goncharenko et al. |
| 6,261,481 B1 | 7/2001 | Akatsuka et al. |
| 6,265,068 B1 | 7/2001 | David et al. |
| 6,288,341 B1 | 9/2001 | Tsunoda et al. |
| 6,344,271 B1 | 2/2002 | Yadav et al. |
| 6,359,232 B1 | 3/2002 | Markovitz et al. |
| 6,393,642 B1 | 5/2002 | Pollman et al. |
| 6,396,864 B1 | 5/2002 | O'Brien et al. |
| 6,432,537 B1 | 8/2002 | Devlin et al. |
| 6,504,102 B2 | 1/2003 | Tsunoda et al. |
| 6,506,331 B2 | 1/2003 | Meguriya |
| 6,509,063 B1 | 1/2003 | McCarthy et al. |
| 6,548,172 B2 | 4/2003 | David et al. |
| 6,572,937 B2 | 6/2003 | Hakovirta et al. |
| 6,632,561 B1 | 10/2003 | Bauer et al. |
| 6,635,720 B1 | 10/2003 | Tomalia et al. |
| 6,746,758 B2 | 6/2004 | Tsunoda et al. |
| 6,821,672 B2 | 11/2004 | Zguris |
| 6,882,094 B2 | 4/2005 | Dimitrijevic et al. |
| 6,905,655 B2 | 6/2005 | Gabriel et al. |
| 6,974,627 B2 | 12/2005 | Morita et al. |
| 7,033,670 B2 | 4/2006 | Smith |
| 7,042,346 B2 | 5/2006 | Paulsen |
| 7,120,993 B2 | 10/2006 | Yamamoto et al. |
| 7,180,409 B2 | 2/2007 | Brey |
| 7,189,778 B2 | 3/2007 | Tobita et al. |
| 7,425,366 B2 | 9/2008 | Okamoto, et al. |
| 2002/0058140 A1 | 5/2002 | Dana et al. |
| 2002/0070621 A1 | 6/2002 | Mori et al. |
| 2002/0098285 A1 | 7/2002 | Hakovirta et al. |
| 2003/0035960 A1 | 2/2003 | Tsunoda et al. |
| 2003/0040563 A1 | 2/2003 | Sagal et al. |
| 2004/0094325 A1 | 5/2004 | Yoshida et al. |
| 2004/0152829 A1 | 8/2004 | Tobita et al. |
| 2004/0241439 A1 | 12/2004 | Morita et al. |
| 2005/0097726 A1 | 5/2005 | Yamamoto et al. |
| 2005/0116336 A1* | 6/2005 | Chopra et al. ............... 257/720 |
| 2005/0161210 A1* | 7/2005 | Zhong et al. ............... 165/185 |
| 2005/0208301 A1 | 9/2005 | Okamoto et al. |
| 2005/0236606 A1 | 10/2005 | Toas et al. |
| 2005/0245644 A1 | 11/2005 | Smith et al. |
| 2005/0274450 A1 | 12/2005 | Smith et al. |
| 2005/0274540 A1 | 12/2005 | Smith et al. |
| 2005/0274774 A1 | 12/2005 | Smith et al. |
| 2005/0277350 A1 | 12/2005 | Smith et al. |
| 2005/0277351 A1 | 12/2005 | Smith et al. |
| 2005/0277721 A1 | 12/2005 | Smith et al. |
| 2005/2077349 | 12/2005 | Smith et al. |
| 2006/0034787 A1 | 2/2006 | Bujard |
| 2006/0142471 A1 | 6/2006 | Shindo |
| 2006/0231201 A1 | 10/2006 | Smith et al. |
| 2006/0234027 A1 | 10/2006 | Huusken |
| 2006/0234576 A1 | 10/2006 | Smith et al. |
| 2006/0258791 A1 | 11/2006 | Okamoto et al. |
| 2006/0280873 A1 | 12/2006 | Smith et al. |
| 2006/0281380 A1 | 12/2006 | Smith et al. |
| 2006/0281833 A1 | 12/2006 | Smith et al. |
| 2007/0026221 A1 | 2/2007 | Stevens et al. |
| 2007/0114704 A1 | 5/2007 | Stevens et al. |
| 2007/0141324 A1 | 6/2007 | Stevens et al. |
| 2008/0050580 A1 | 2/2008 | Stevens et al. |
| 2008/0066942 A1 | 3/2008 | Miller |
| 2008/0262128 A1 | 10/2008 | Stevens et al. |

FOREIGN PATENT DOCUMENTS

| | | |
|---|---|---|
| EP | 0 266 602 A1 | 5/1988 |
| EP | 0 394 767 A2 | 10/1990 |
| EP | 0 604 804 A2 | 7/1994 |
| EP | 1 220 240 A1 | 7/2002 |
| EP | 1 300 439 A1 | 4/2003 |
| EP | 1 383 226 A1 | 1/2004 |
| EP | 1 384 567 A1 | 1/2004 |
| EP | 1 486 997 A1 | 12/2004 |
| EP | 1 530 223 A1 | 5/2005 |
| GB | 881036 A2 | 11/1961 |
| JP | 56029305 | 3/1981 |
| JP | 03205443 A | 9/1991 |
| JP | 06313267 A | 11/1994 |
| JP | 10-088201 | 4/1998 |
| JP | 10-211659 | 8/1998 |
| JP | 2002212422 A | 7/2002 |
| JP | 200506389 A | 1/2005 |
| JP | 2005-199562 A | 7/2005 |
| WO | WO 95/02504 A1 | 1/1995 |
| WO | WO 96/28073 A1 | 9/1996 |
| WO | WO 98/41993 A1 | 9/1998 |
| WO | WO 99/26286 A1 | 5/1999 |
| WO | WO 00/56127 A1 | 9/2000 |
| WO | WO 01/68749 A1 | 9/2001 |
| WO | WO 01/84659 A1 | 11/2001 |
| WO | WO 03/040445 A1 | 5/2003 |
| WO | WO 2004/006271 A1 | 1/2004 |
| WO | WO 2004/052999 A2 | 6/2004 |
| WO | WO 2004/067606 A1 | 8/2004 |
| WO | WO 2005/069312 A1 | 7/2005 |
| WO | WO 2005/106089 A2 | 11/2005 |
| WO | WO 2005/123825 A2 | 12/2005 |
| WO | WO 2005/124790 A2 | 12/2005 |
| WO | 2006007385 A1 | 1/2006 |
| WO | WO 2006/002014 A1 | 1/2006 |

OTHER PUBLICATIONS

Bisphenol A Epoxy Product Information, Dow Chemical.*

Von Roll Isola, "Mica Tapes," product literature, 381.58, date unknown.

Tomoyuki Matsumura, "Phase Structures and Thermal and Conductive properties of Epoxy-Alumina Hybrids Filled with Conductive Fillers," STN database No. 2002:257918, Apr. 8, 2007.

Yasufumi Shibata, "Lipophilic Inorgantic-Organic Hybrid Materials with Low Frictional Coefficient," STN database No. 2002:568167, Jul. 3, 2002, pp. 1-3.

Tari et al., "Impacts on Turbine Generator Design by the Application of Increased Thermal Conducting Stator Insulation" Cigre SC11-01 Meeting, Paper No. 132 (2002).

Sun et al., "Fundamental Research on Surface Modification of Nano-sized Silica for Underfill Applications" 2004 Electronic Components and Technology Conference (2004).

Brutsch et al., "New High Voltage Insulation with Increased Thermal Conductivity" Electrical Electronics Insulation Conference 1993 Proceedings, (Oct. 1993).

Tari et al., "A High Voltage System with Increased Thermal Conductivity for Turbo Generators" Coil Winding, Insulation and Electrical Manufacturing Conference (2001).

Derwent Acc-No. 1980-39239C (JP 55053802 A Derwent Abstract) (Nippon Mica Seisaku).

Product Data Sheet for Polar Therm Boron Nitride Powder Grades PT120, PT140, PT160, and PT 180, provided by Momentive Performance Materials (2007).

* cited by examiner

SEEDING RESINS FOR ENHANCING THE CRYSTALLINITY OF POLYMERIC SUBSTRUCTURES

CROSS-REFERENCE TO RELATED APPLICATIONS

This application is a Continuation in Part of U.S. application Ser. No. 11/152,984, filed on Jun. 14, 2005 "Structured Resin Systems with High Thermal Conductivity Fillers," by Smith, et al., which is incorporated herein by reference.

FIELD OF THE INVENTION

The field of the invention relates to enhancing the crystallinity of non mesogenic resins with mesogenic resins.

BACKGROUND

With the use of any form of electrical appliance, there is a need to electrically insulate conductors. With the push to continuously reduce the size and to streamline all electrical and electronic systems there is a corresponding need to find better and more compact insulators and insulation systems.

Various epoxy resin materials have been used extensively in electrical insulation systems due to their practical benefit of being tough and flexible electrical insulation materials that can be easily adhered to surfaces. Traditional electrical insulation materials, such as mica flake and glass fiber, can be surface coated and bonded with these epoxy resins, to produce composite materials with increased mechanical strength, chemical resistance and electrical insulating properties. In many cases epoxy resins have replaced traditional varnishes despite such materials having continued use in some high voltage electrical equipment.

Good electrical insulators, by their very nature, also tend to be good thermal insulators, which is undesirable. Thermal insulating behavior, particularly for air-cooled electrical equipment and components, reduces the efficiency and durability of the components as well as the equipment as a whole. It is desirable to produce electrical insulation systems having maximum electrical insulation and minimal thermal insulation characteristics.

Electrical insulation often appears in the form of insulating tapes, which themselves have various layers. Common to these types of tapes is a paper layer that is bonded at an interface to a fiber layer, both layers tending to be impregnated with a resin. A favored type of insulation material is a mica-tape. Improvements to mica tapes include catalyzed mica tapes as taught in U.S. Pat. No. 6,103,882. The mica-tape may be wound around conductors to provide extremely good electrical insulation. An example of this is shown in FIG. 1. Illustrated here is a coil 13, comprising a plurality of turns of conductors 14, which in the example illustrated here are assembled into a bakelized coil. The turn insulation 15 is prepared from a fibrous material, for example glass or glass and Dacron which is heat treated. Ground insulation for the coil is provided by wrapping one or more layers of composite mica tape 16 about the bakelized coil 14. Such composite tape may be a paper or felt of small mica flakes combined with a pliable backing sheet 18 of, for example, glass fiber cloth or polyethylene terephthalate mat, the layer of mica 20 being bonded thereto by a liquid resinous binder. Generally, a plurality of layers of the composite tape 16 are wrapped about the coil depending upon voltage requirements. A wrapping of an outer tape 21 of a tough fibrous material, for example, glass fiber, may be applied to the coil.

Generally, multiple layers of the mica tape 16 are wrapped about the coil with sixteen or more layers generally being used for high voltage coils. Resins are then impregnated into the tape layers. Resins can even be used as insulation independently from the insulating tape. Unfortunately this amount of insulation only further adds to the complications of dissipating heat. What is needed is electrical insulation that can conduct heat higher than that of conventional methods, but that does not compromise the electrical insulation and other performance factors including thermal and mechanical capabilities.

Other difficulties with the prior art also exist, some of which will be apparent upon further reading.

SUMMARY OF THE INVENTION

With the foregoing in mind, methods and apparatuses consistent with the present invention, which inter alia facilitates the total degree of order and effective crystallinity of resin system includes the addition of a highly structured resin system to a less structured resin system to impart a degree of order from the structured resin system to the less structured resin system.

These and other objects, features, and advantages in accordance with the present invention provide particular embodiments by a resin mixture that comprises a highly structured resin and a less structured resin. The highly structured resins and the less structured resin are mixed to a ratio of between 1:9 and 4:1 by volume, with a more particular ratio of 1:2 to 3:1. The highly structured resin forms ordered micro regions and the ordered micro regions impose order on surrounding less structured resin molecules. The micro regions are essentially groups of the HS resin that will naturally form order structures.

In related embodiments, the ordered micro regions form continuous matrices within the resin mixture. In some embodiment cross-linking agents and/or HTC materials are added. In other related embodiment the HS resins are aligned by means of an external field of force and/or a flow field.

In another embodiment the present invention provides for a method of forming ordered regions within a resin mixture that comprises obtaining a highly structured resin and mixing the highly structured resin with a less structured resin, where the ratio of highly structured resin to less structured resin is from 1:9 to 4:1. The highly structured resin forms ordered regions and the ordered regions impose order on surrounding less structured resin molecules, and the ordered regions form continuous matrices within the resin mixture.

In particular embodiments the mixing is allowed to occur via diffusion, while in others the mixing is mechanical. In some embodiments the HS resin is put onto a material as a layer that the LS resin is impregnated into. Depending on when and how the LS resin is impregnated, the two resins may mix through diffusion, or the actual act of impregnation can provide the physical mixing process.

In still another embodiment the present invention provides for a method of creating a mixed resin matrix with ordered regions that comprises placing a layer of highly structured resin onto a material and impregnating into the material a less structured resin. Then allowing the highly structured resin and the less structured resin to diffuse before curing. The highly structured resin forms ordered regions and the ordered micro regions impose order on surrounding less structured resin molecules.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

The present invention provides for the seeding of a less structured resin with a structured resin to produce an overall resinous matrix that is more highly structured than just the straight individual structures of the two resin types would produce. Highly structured (HS) resin, such as linear (thermoplastics) or cross linked polymers—(thermosetting) resins, form highly structured regions and as a result have improved physical properties such as higher thermal conductivity in the resin after it is cured.

In an HS resin there are mesogenic regions, which are essentially rigid rod-like sections capable of forming a paracrystalline, crystalline or liquid crystal structure. These regions of HS resins can influence the less structured (LS) resin molecules around them if the HS and LS resins molecules are chemically compatible. In this case, the HS molecules essentially force the LS resin molecules to align with the HS resin molecules, creating a larger structured area that has the enhanced physical properties of the HS resin. Fillers, such as high thermal conductivity (HTC) materials may be added to this heterogeneous structured resin, either before or after the two types of resins are mixed. Some fillers will align themselves within the structured areas.

Non-mesogenic and less and/or partially ordered rod-like resin systems refer to resins that do not tend to form highly structured regions, i.e. crystallize. Although the present application may use the term non-mesogenic, it is to be understood that there can be some small rigid, rod-like section in the non-mesogenic resin, but not enough to form a highly structured region when in a homogeneous matrix. Similarly, a non-mesogenic or partially ordered rod-like resin may not under most circumstances form a highly structured resin, but may have certain molecular aggregation properties when combined with highly structured resin. In other words, by itself, the non-mesogenic resins may not easily crystallize or order, but when combined with HS resins, the heterogeneous mixture may more readily form ordered regions than an HS resin mixed with completely non-mesogenic resins. The term less structured (LS) resin therefore refers to both the non-mesogenic and partially ordered rod-like resins. Resins that are not HS are LS.

Figure 1:
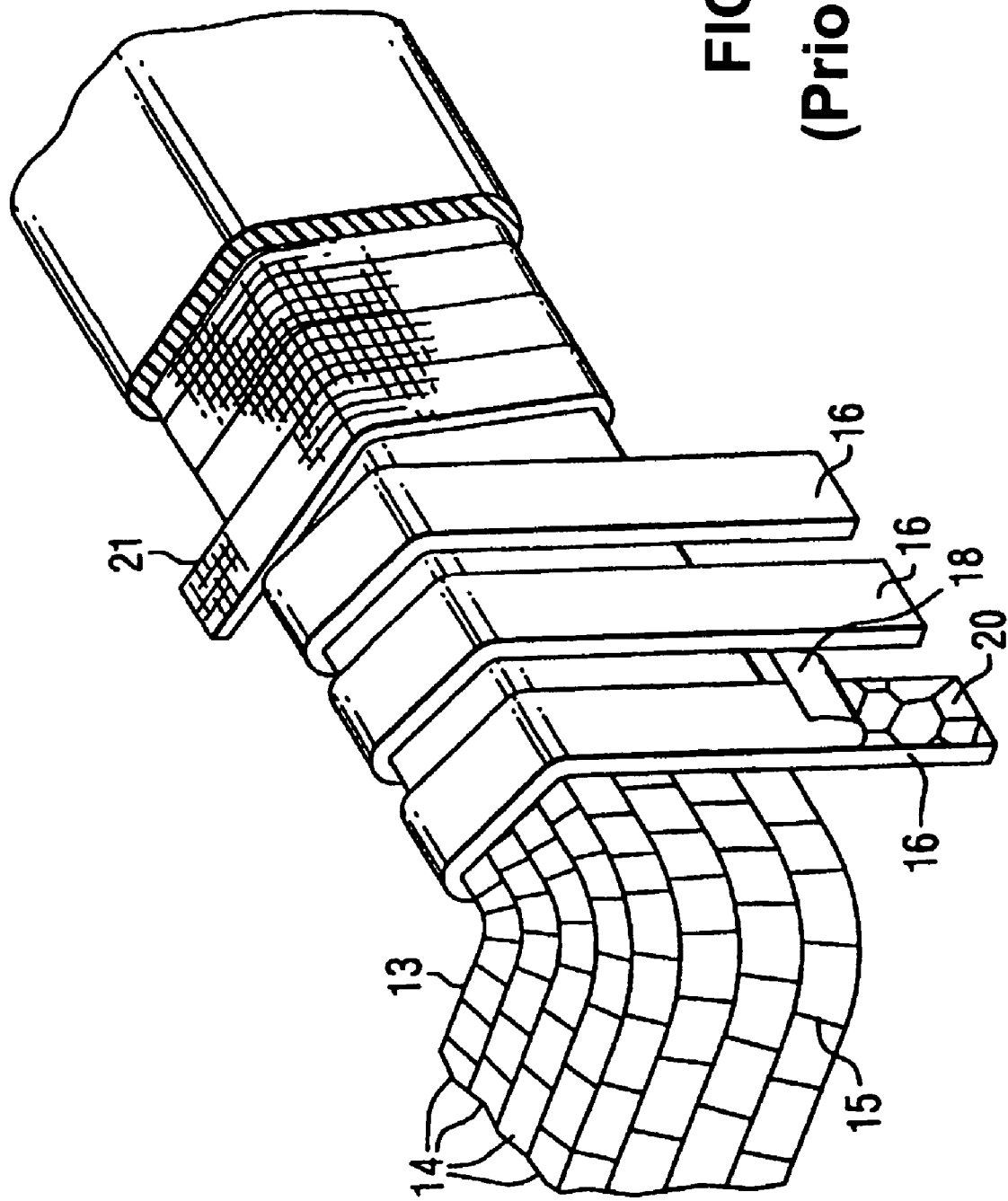
FIG. 1 shows the use of an insulating tape being lapped around a stator coil.
Figure 2:
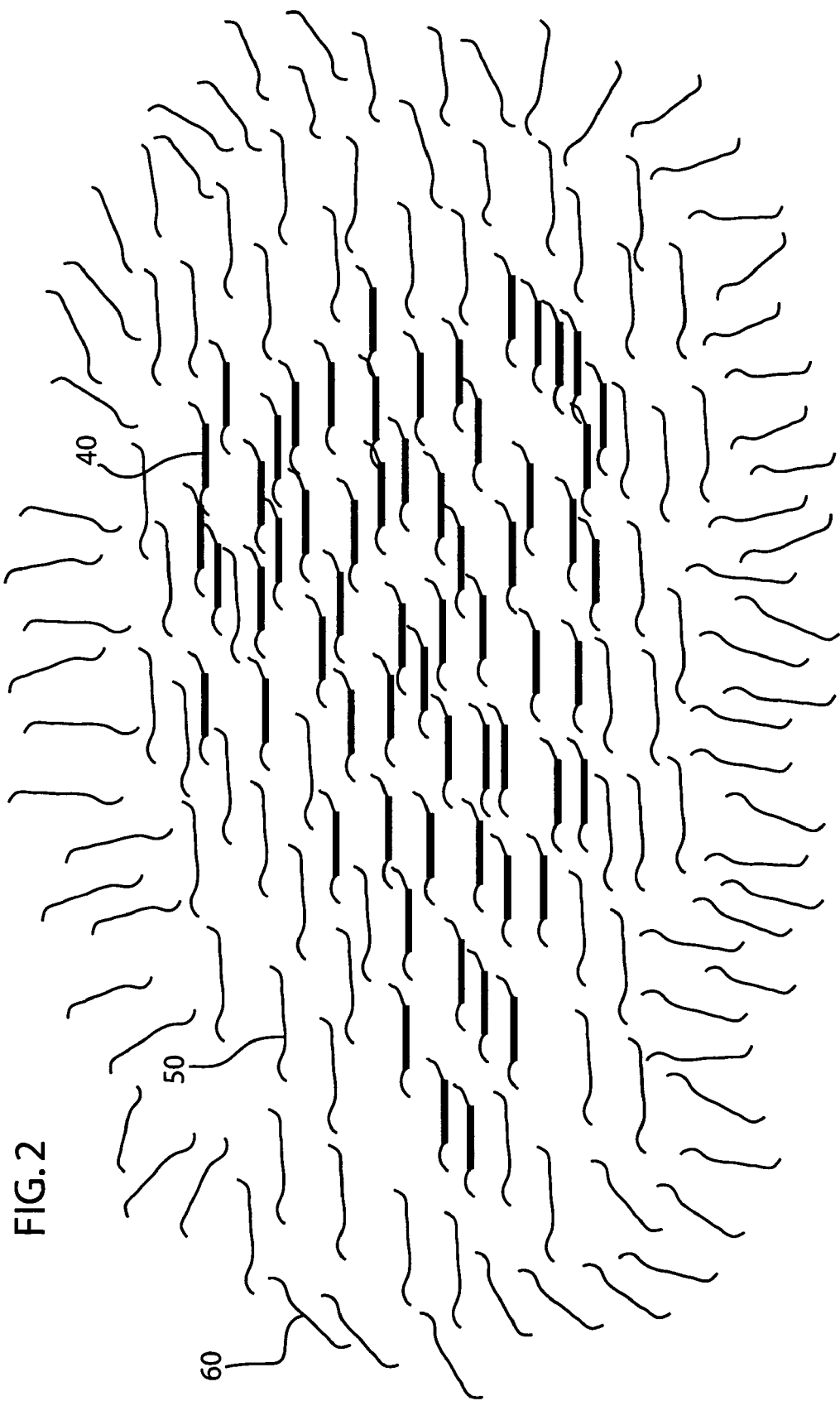
FIG. 2 illustrates highly structured resins imposing order on less structured resins, forming ordered regions.

FIG. 2 illustrates HS resins 40 forming a structured region within a LS resin 60. Parts of the LS resin 50 align around the HS resin region and become similarly aligned. These regions will obviously exhibit greater density than the non-ordered regions. Phonons passing through the resin mixture will pass along the highly structured areas with less scattering, increasing the overall thermal conductivity of the resin. This figure is somewhat stylized, and the amount of order that the HS resins impart on the LS resins can be greater than that shown. FIG. 2 exemplifies a liquid crystal type resin. Other types of HS resins will have a different appearance on the micro-scale.

When the HS and LS resins are mixed structured areas form, the degree to which the LS forms structured regions is dependant upon the amount of LS to HS resin. For example, a mixture of 95% HS resin would impart a highly ordered structure on the mixture. A 5% HS resin, if thoroughly mixed, would produce a much lower degree of ordering on the mixture. The mixing of the two resins is therefore a consideration, with higher concentrations of HS resin favoring a greater amount of local and extended ordering. The HS resins, however, also will tend to aggregate together even when mixed with the LS resins. These aggregates will therefore form seeds which will encourage ordering of the LS resins around them. These seed will maintain their ordering properties even after repeated melting and recrystallization.

Figure 3:
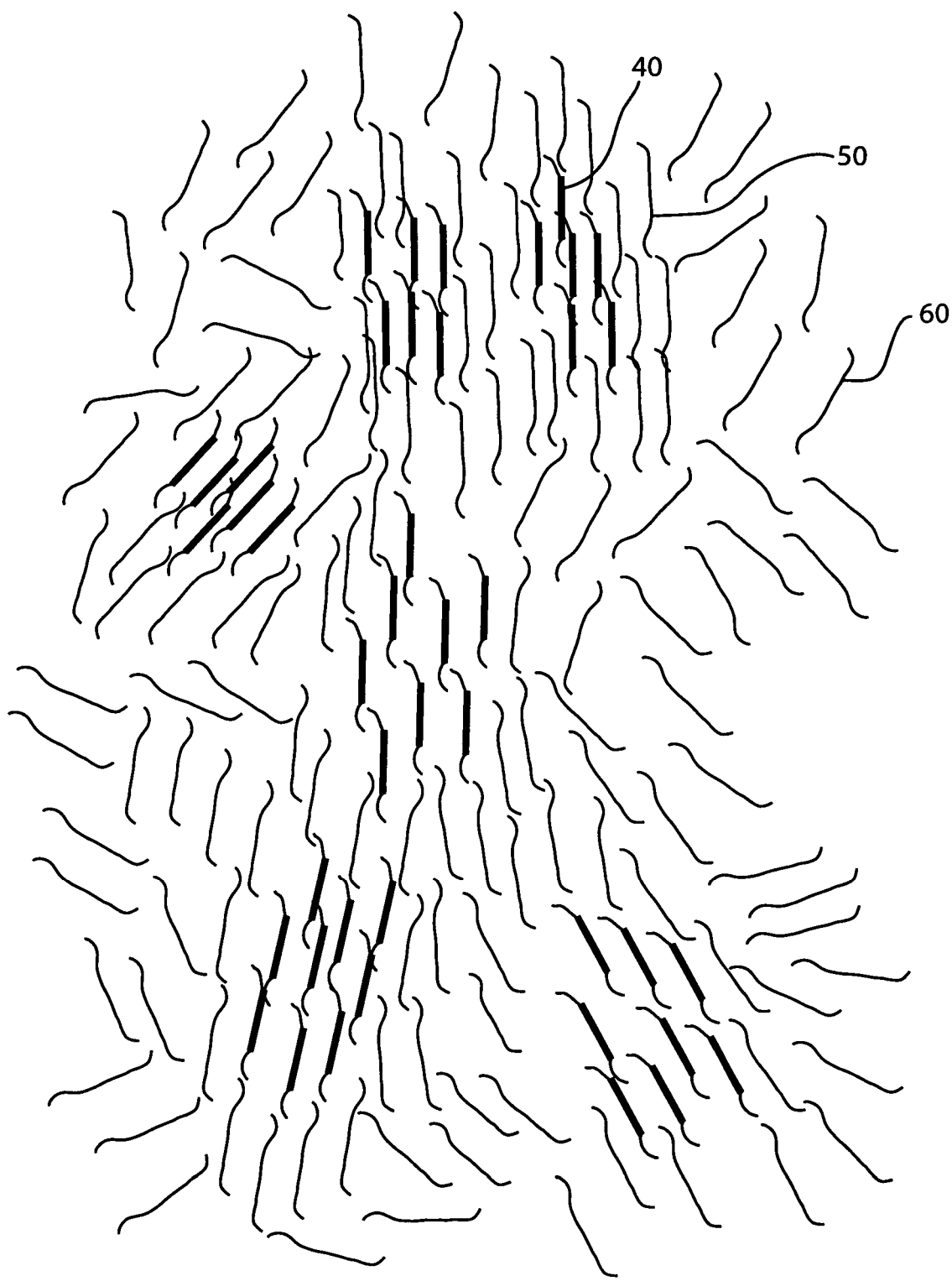
FIG. 3 illustrates interconnected ordered regions.

FIG. 3 shows several groups of HS resins 40 and their surrounding ordered LS resins 50 mixed within an LS resin 60. Although the HS resin groups do not directly interconnect, the ordered regions around them do. This provides interconnected ordered regions, and the flux of phonons passing though the resins will tend to follow these interconnected ordered regions. The amount of order a cluster of HS resin imparts on the LS resin around it will depend on factors such as molecule size and similarity, however a given volume of HS resin can impart order on approximately twice the volume of surrounding LS resin.

The ratio of HS to LS resins can be varied, but in order to maintain interconnected regions of higher structure, there should be at least 25% of HS resin. The greater amount of HS resin, the greater the number of highly structured regions. The LS resins, however, are useful for a variety of reasons. In general, they are less expensive than HS resins. They may also be less viscous depending on molecular weight and temperature. A straight HS resin, in some applications, may be too viscous for proper impregnation of tape wound and laminate structures, while a HS/LS mixed resin can be sufficiently fluid for penetration, while not sacrificing the majority of the HS properties. Also, the LS resins are known to adhere better to surfaces, such as glass fibers used in tape insulation. Other benefits of the LS resins are dependant on the specific types of LS resins selected such as mechanical and viscoelastic properties and glass transition behavior.

The extent of the conferred ordering of the HS resin on the LS resin depends upon the molecular structure of the LS resin. The degree of conferred ordering will be higher for LS molecules having lower molecular weight and greater rod-like character and having similar centre and end-group chemical group structure to that of the HS resin. The amount of order conferred also depends on the extent that the HS and LS resins are mixed. In examples given, where the resins are layered and allowed to partially diffuse into each other there will be some regions where the two types of resin aren't thoroughly mixed, and therefore no ordering will be imparted.

The LS form up with the HS resins in part due to the structural similarities. For example, epoxy groups at the ends of both chains have an affinity for each other and will closely associate. To help this, cross linking agents can be added. When activated, the cross linking will effectively covalently lock the LS resins to the HS resins, ensuring that the imposed order around the HS regions is stable. This will favor retention of the order in the cross-linked network.

Resins are used in a plurality of industries, and have a large number of uses. Different properties of the resins affect not only their uses, but also the quality and efficiency of the products that they are used with. For example, when resins are used in electrical insulation applications, their characteristics of dielectric strength and voltage endurance needs to be high, as does the thermal stability and thermal endurance. However, often contrary to these objectives, resins usually will also have a low thermal conductivity. The present invention balances the various physical properties of resins and the insulation system they are introduced into to produce a system that has a higher thermal conductivity than conventional electrically insulating materials while maintaining adequate, and even enhancing, key physical and electrical properties such as dielectric strength, voltage endurance, thermal stability and thermal endurance, mechanical strength and viscoelastic response. Delamination and microvoid formation resulting from stresses caused by thermal and mechanical cycling effects are reduced or eliminated. As used herein, the term resin refers to all resins and epoxy resins, including modified epoxies, polyesters, polyurethanes, polyimides, polyesterimides, polyetherimides, bismaleimides, silicones, polysiloxanes, polybutadienes, cyanate esters, hydrocarbons etc. as well as homogeneous blends of these resins. This definition of resins includes additives such as cross-linking agents, accelerators and other catalysts and processing aids. Certain resins, such as liquid crystal thermosets (LCT) and 1,2 vinyl polybutadiene combine low molecular weights characteristics with good crosslinking properties. Further details on LCT resins can be found in U.S. Pat. No. 5,904,984, Smith, et. al., which is incorporated herein by reference. The resins can be of an organic matrix, such as hydrocarbons with and without hetero atoms, an inorganic matrix, containing silicate and/or alumino silicate components, and a mixture of an organic and inorganic matrix. Examples of an organic matrix include polymers or reactive thermosetting resins, which if required can react with the reactive groups introduced on inorganic particle surfaces. Cross-linking agents can also be added to the resins to manipulate the structure and segmental length distribution of the final crosslinked network, which can have a positive effect on thermal conductivity. This thermal conductivity enhancement can also be obtained through modifications by other resin additives, such as catalysts, accelerators and other processing aids. Reactive and non-reactive diluents may also be added.

Certain resins, such as liquid crystal thermosets (LCT) and 1,2 vinyl polybutadiene combine low molecular weights characteristics with good crosslinking properties. These types of resins tend to conduct heat better because of enhanced micro and macro ordering of their sub-structure which may lead to enhanced conduction of heat as a result of improved phonon transport. The better the phonon transport and the lower the phonon scattering the better the heat transfer.

These types of resins are referred to as highly structured (HS) resins, since they form highly organized micro-structures both prior to and during crosslinking when cured. The structures include crystallinity, para-crystallinity and liquid crystalline structures, unique polymer architectures, controlled crosslinking and network expansion and contraction during cure. The use of HS resins enhances the HTC properties, particularly to heat conductivity and can achieve significant enhancement of electrical and mechanical properties. In addition, the ordering of the HS resins can help to order/align the HTC fillers, which further enhances their physical properties, and can even increase both reactive covalent bonding and non-covalent bonding between the resin matrix and the fillers, because of lower steric hindrance between the resin matrix and the fillers.

Examples of particular types of HS resins fall into seven categories. The liquid crystal polymers discussed above, strained interpenetrating networks (IPNs), dendrimer molecules, expanding polymers, ladder polymers, star polymers and structured organic-inorganic hybrids.

The liquid crystal polymers are a special class of polymer that are typically aromatic polyesters that provide excellent physical properties such as high heat deflection while maintaining other physical characteristics. The liquid crystal polymer structures comprise densely packed, highly crystalline fibrous polymer chains that provide self-reinforcement, even almost up to the melting point of the polymer. Specific examples include Xydar™, which is biphenol based, Vectra™, which is naphthalene based and Zenite™ which is provided by DuPont™.

Figure 4:
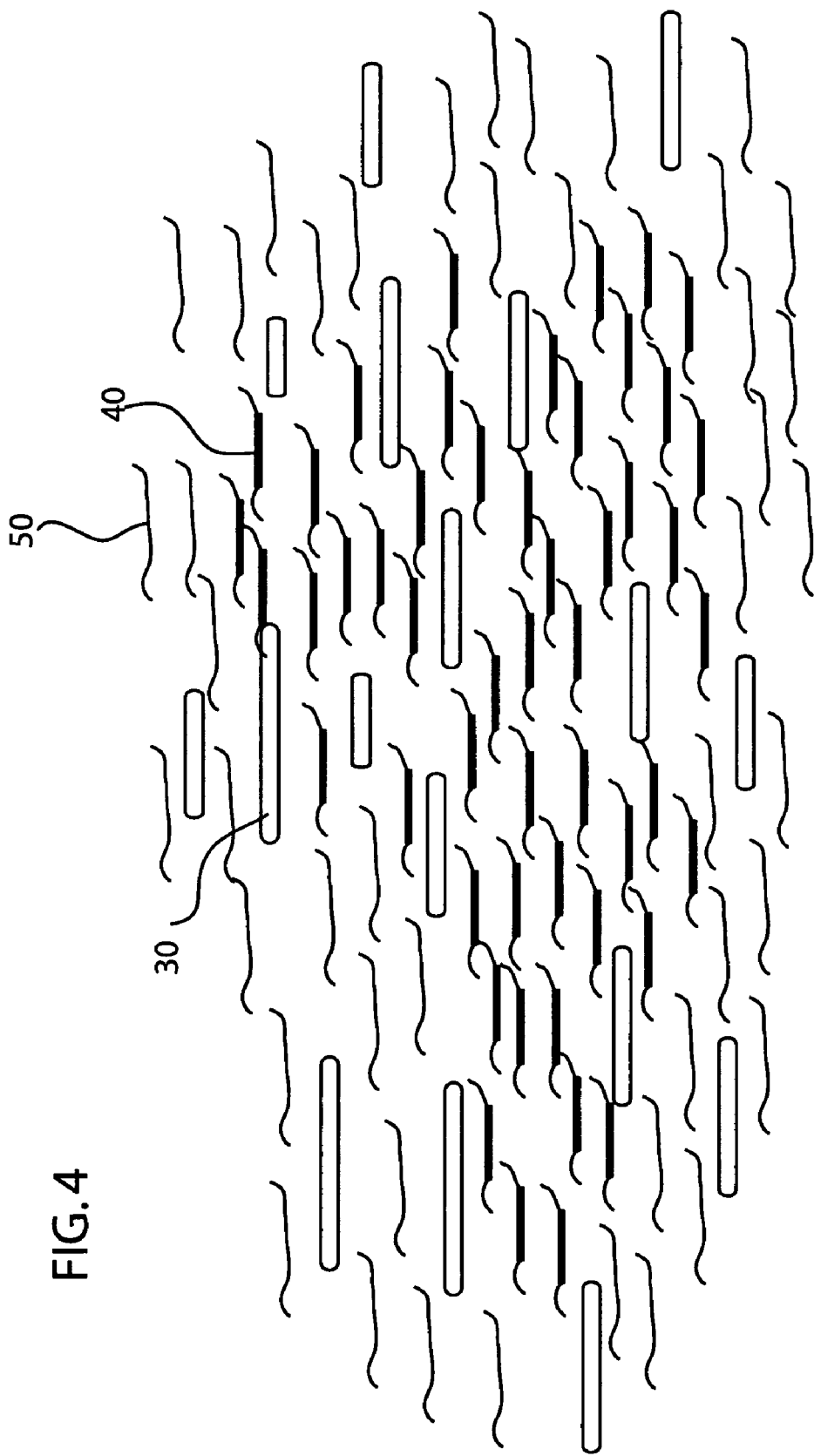
FIG. 4 illustrates HTC particles dispersed in and ordered by an ordered region.

FIG. 4 shows an example of an LCT type resin that forms mesogenic groups 40 that tend to self align on a small scale and impart an order on the surrounding LS resin 50. The mesogenic groups and units tend to be from 0.5-100 nm in length, depending on the type of resin, and aggregates of mesogenic groups can be several hundred nanometers long. Aligned within the mesogenic groups and ordered LS resins are HTC fillers 30. In particular embodiments the mesogenic groups are aligned in concert with the HTC fillers. The alignment of the mesogenic groups can thereby aid in the alignment of the fillers creating aligned areas that are thousands of nanometers in length. Conversely, it is also possible for aligned fillers to help align the HS resins.

Interpenetrating Networks (IPN's) are materials containing two polymers, each in network form. Several kinds of IPN architectures exist, such as non-covalent semi-IPN, non-covalent full IPN and covalent semi-IPN. A non-covalent semi-IPN is one in which only one of the polymer systems is cross-linked. A non-covalent full IPN has two separate polymers independently cross-linked. A covalent semi-IPN contains two separate polymer systems that are cross-linked to form a single polymer network. A covalent semi-IPN is similar to a non-covalent IPN because one of the polymer systems can be crosslinked without networking with the second linear system. Thermalastic™ resins are examples of semi-IPN resins in which polystyrene chains are crosslinked with epoxy-anhydrides/polyesters. Organic-inorganic covalent IPN materials can incorporate silicon alkoxides along the backbone chain via free radical polymerization through a vinyl functional group or via condensation with an organic moiety on a silicon alkoxide monomer. These types of IPN can even interact with inorganic networks with inorganic fillers.

Structured organic-inorganic hybrids include the polyhedral oligomeric silsesquioxanes (POSS), tetraethyl orthosilicate (TEOS) and tetrabutyl orthotitanate (TBOT) and related monomeric and oligomeric hybrid compounds discussed above. Although not specifically illustrated in any of the figures, covalent bonds between the fillers and the host network are possible in some embodiments.

Dendrimer type matrices share similarities to the dendrimer fillers discussed herein, but form the host matrix rather than the filler. The dendrimer polymer comprises a core, and interior area containing many branches or repeating units, called generations, radially connected to the core, and an exterior region of terminal moieties. A dendrimer can be defined into a multitude of structures by fine tuning the architectural components. The surface of the dendrimer can be composed of a large number of functional groups which can be reacted with other polymer species to give unusual copolymer structures. These functional groups include amino, hydroxyl and carboxyl which would be reactive with resins such as the LCT epoxies. Specific types of dendrimers include polypropylene-imine, polyamido-amine, and polyamido-amines with an organic silicon exterior. These types of polymers can also form inorganic networks with the inclusion of inorganic fillers.

Expanding polymers are a class of highly strained cyclic monomers which have the ability to increase in volume as the highly strained cyclic ring opens to polymerize. So the polymer will expand as it cures and not shrink as most resins do. Total volume expansion can be 5-10%. The polymerization mechanism that gives ring opening can be anionic, cationic or free radical, therefore copolymers with epoxy resins and vinyl monomers containing resins are possibilities, due to the similarities of their reaction kinetics. Examples of expanding monomers include spiro, spiro ortho esters, spiro ortho carbonates, cyclic ketene acetals, cyclic vinyl ethers, unsaturated spiro ortho carbonates and unsaturated spiro ortho esters. The expansion phenomena during cure displayed by these types of materials benefits the addition of HTC fillers by causing higher internal compression at the microstructure level, causing increased particle contact, which increases thermal conductivity and electrical voltage endurance. In one embodiment there highly strained ring structures are present which are responsible for expansion combined with monomer units that are covalently linked to HTC fillers. Although many of the HS resins listed can be mixed with one another, the expanding polymers are particularly suited to be combined with the liquid crystal polymers.

Ladder polymers are highly structured polymers that consist of two main chains or backbones that bond together at regular intervals forming a ladder type structure. A polyimide made from a dianhydride and tetra-amine would be an example of this. Double-stranded ladders occur when a polymer in which the molecules consist of an uninterrupted sequence of rings with adjacent rings having one atom in common (spiro polymer) or two or more atoms in common (ladder polymer).

Star polymers are similar to dendrimers but differ in the way that they are synthesized and in their chemical structures. Star polymers are characterized by a high number of identical-size chains emerging out of a small core. The spherical shape of these polymers and the high order of branching gives star polymers unique properties, such as high compactness and segment density. An example of a particular star polymer would have a divinylbenzene core with polystyrene arm branches. Another example are methacrylate cores with polyethylene branches. The arm lengths can be controlled by the stoichiometric proportions of styrene and the initiator scheme, and the arm number is regulated by the stoichiometric quantity of divinylbenzene. Exemplary types of LS resins include bisphenol-A and bisphenol-F., epoxy-novolac, cycloaliphatic epoxy, hydantoin and aliphatic epoxies, which are compatible with and can be ordered by the HS resins.

As discussed above, the HS resins tend to aggregate on the molecular scale even when relatively thoroughly mixed with the LS resins. This results in a uniform dispersion of ordered regions throughout the mixed resin. Even without mechanical mixing, however, the HS and LS resins will mix to some extent if put in intimate contact, and order will be conferred into the LS resins.

For example, a HS layer may be placed on a surface, and then an LS layer placed on top of it. At the interface between the two layers, the resins will mix, and regions of order will extend into the LS layer. Techniques such as this can be used when normal mixing the two resins types is impractical or not desired.

Figure 5:
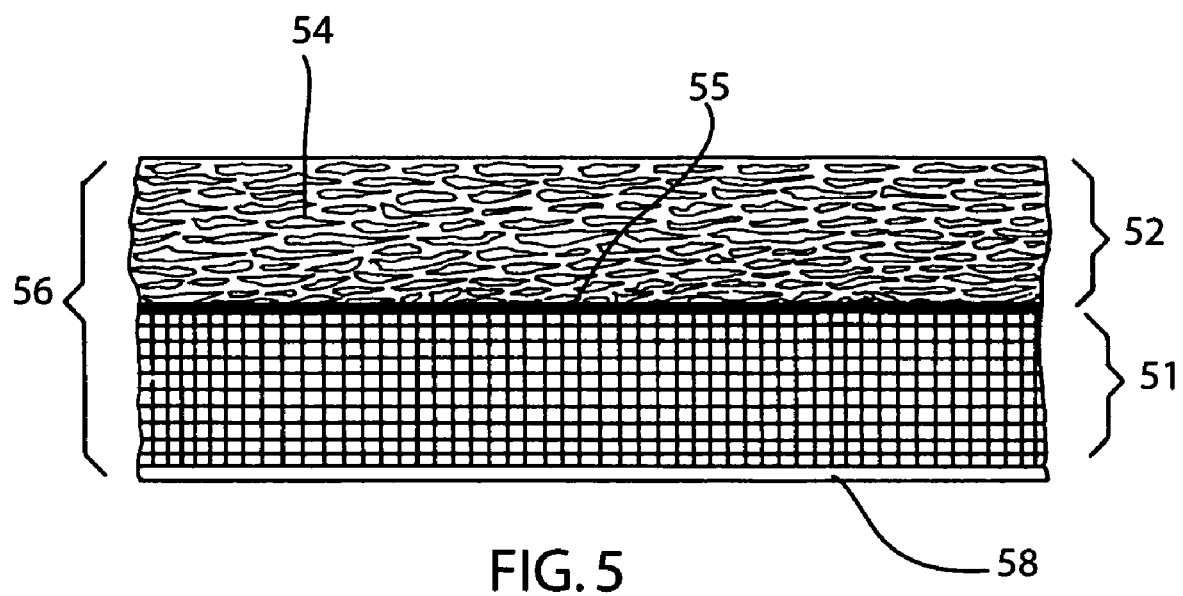
FIG. 5 illustrates a cross section of a composite tape being used with the present invention.

A particular example of this is illustrated in FIG. 5. Here a composite tape 56 to which the resin can be applied. The mica layer 52, which is normally resistant to coating but which can be more readily coated with a LS resin, is comprised of many mica flakes 54. The mica layer is bonded to a backing, such as a glass fabric layer 51, and an additional, backing 58 may be present on one or both sides. The layers depicted are stylized for illustration purposes and are not to exact scale.

The two layers 52, 51 tend to be bonded together with a resin 55 such as a mica-bond. The entire tape is later impregnated with an impregnating resin, a typical one being Micalastic™ resin. The desired properties of the mica-bond are different than that of the Micalastic™. The mica bond resin is applied as a layer, while the Micalastic™ is impregnated into the tape. Therefore HS resins make a suitable mica-bond, while an LS is better as a Micalastic™. Once the LS/Micalastic™ resin has been impregnated, however, the two resins diffuse into one another, and a larger ordered region is created.

The HS can be oriented by the application of external fields of force. Examples of such fields are magnetic, electric and mechanical (AC/dynamic, DC/static, pulsed and combinations thereof), sonic and ultrasonic. For example, dielectrophoresis or electrophoresis may be used. The fields affect the resin molecules due to their dipole moment, but clusters also have a net dipole moment which the external fields will affect. Additionally, fluid flow fields can affect the orientation of the HS resins to distribute and structurally organize them. The flow field aligns the HS and pulls LS into alignment with it.

The resins may be used as bonding resins in a variety of industries such as circuit boards and insulating tapes. A particular kind of insulating tape is the mica-glass tape used in the electrical generator fields. Resins with these types of tapes can be used as bonding resins, or as impregnating resins as is known in the art. The resin may also be used in the electrical generator field without the tapes to fulfill electrical insulation applications in the rotating and static electrical equipment components.

In addition to the standard mica (Muscovite,Phlogopite) that is typically used for electrical insulation there is also Biotite mica as well as several other mica-like Alumino-Silicate materials such as Kaolinite, Halloysite, Montmorillonite and Chlorite. Montmorillonite has lattices in its structure which can be readily intercalated with polymer resins, metal cations and nano particles to give high dielectric strength composites.

The tapes may be impregnated with resin before or after being applied to electrical objects. Resin impregnation techniques include VPI and GVPI, discussed more below. In VPI, once a tape is lapped and impregnated it is compressed. Once in position, the resin in the compressed tape is cured, which effectively locks the position of the HTC materials. In some embodiments the resin is cured in a two stage process, as will be apparent to one of ordinary skill in the art. However, optimal compression of the loaded HTC materials favors a completely uncured resin during the compression stage.

In other embodiments, the present invention is used as a continuous coating on surfaces where insulation is desired; note that "continuous coating" is a description of a macro-scale application. In a continuous coating, the resin forms a coating on materials without the need for a tape or other substrate. When used with a substrate, the HTC materials can be combined with the resin by a variety of different methods. For example, they can be added prior to the resin being added to the substrate, or the HTC materials can be added to the substrate before the resin is impregnated thereon, or the resin can be added first, followed by the HTC material and then an additional impregnation of resin. Other fabrication and process methods will be apparent to one of ordinary skill in the art.

In one embodiment the present invention provides for a resin mixture that comprises a highly structured resin and a less structured resin. The highly structured resin and the less structured resins are mixed to a ratio typically of between 1:9 and 4:1 by volume, with a more particular ratio of 1:2 to 3:1. The highly structured resin forms ordered micro regions and the ordered micro regions impose order on surrounding less structured resin molecules. The micro regions are essentially groups of the HS resin that will naturally form ordered structures.

In related embodiments, the ordered micro regions form continuous matrices within the resin mixture. In some embodiment cross-linking agents and/or HTC materials are added. In other related embodiment the HS resins are aligned by means of an external field and/or a flow field.

In another embodiment the present invention provides for a method of forming ordered regions within a resin mixture that comprises obtaining a highly structured resin and mixing the highly structured resin with a less structured resin, where the ratio of highly structured resin to less structured resin is from 1:9 to 4:1. The highly structured resin forms ordered regions and the ordered regions impose order on surrounding less structured resin molecules, and the ordered regions form continuous matrices within the resin mixture.

In particular embodiments the mixing is allowed to occur via diffusion, while in others the mixing is mechanical. In some embodiments the HS resin is put onto a material as a layer that the LS resin is impregnated into. Depending on when and how the LS resin is impregnated, the two resins may mix through diffusion, or the actual act of impregnation can provide the physical mixing process.

In still another embodiment the present invention provides for a method of creating a mixed resin matrix with ordered regions that comprises placing a layer of highly structured resin onto a material and impregnating into the material less structured resins. Then allowing the highly structured resin and the less structured resin to diffuse before curing. The highly structured resin forms ordered regions and the ordered micro regions impose order on surrounding less structured resin molecules.

The layer of highly structured resin absorbs at least partially into the material, and in some embodiments the material is a layer in a composite tape. On a composite tape, the layer may be placed at the mica-glass interface. In all cases HTC materials may be mixed in with the resin and/or the material.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A composite resin mixture comprising:
   a highly structured resin comprising highly structured resin molecules;
   a less structured resin comprising less structured resin molecules;
   wherein said highly structured resin and said less structured resin are mixed to form the composite resin mixture;
   wherein the ratio of highly structured resin to less structured resin in the composite resin mixture is from 1:9 to 4:1 by volume;
   wherein, within the composite resin mixture, a plurality of the highly structured resin molecules are effective to impose order on a plurality of surrounding less structured resin molecules and to cause the plurality of surrounding less structured resin molecules to adopt an orientation similar to that of the plurality of the highly structured resin molecules, thereby forming ordered micro regions in the composite resin mixture comprising the plurality of the highly structured resin molecules and the plurality of surrounding less structured resin molecules; and
   a plurality of cross linking agents effective to covalently bond the plurality of highly structured resin molecules to respective molecules of the plurality of surrounding less structured resin molecules and effective to stabilize the ordered micro regions upon activation of the cross linking agents.

2. The composite resin mixture of claim 1, wherein said ordered micro regions form continuous matrices within said resin composite mixture.

3. The composite resin mixture of claim 1, wherein said highly structured resin is a liquid crystal thermoset.

4. The composite resin mixture of claim 1, wherein said highly structured resin is a polyhedral oligomeric silsesquioxane.

5. The composite resin mixture of claim 1, wherein said ratio of highly structured resin to said less structured resin is from 1:5 to 3:1 by volume.

6. The resin mixture of claim 1, wherein the plurality of the highly structured resin molecules are aligned by application of an external field to a degree effective to pull the plurality of surrounding less structured resin molecules into alignment with the plurality of the highly structured resin molecules.

7. An insulating tape impregnated with the composite resin mixture of claim 1.

* * * * *